Figure 1:
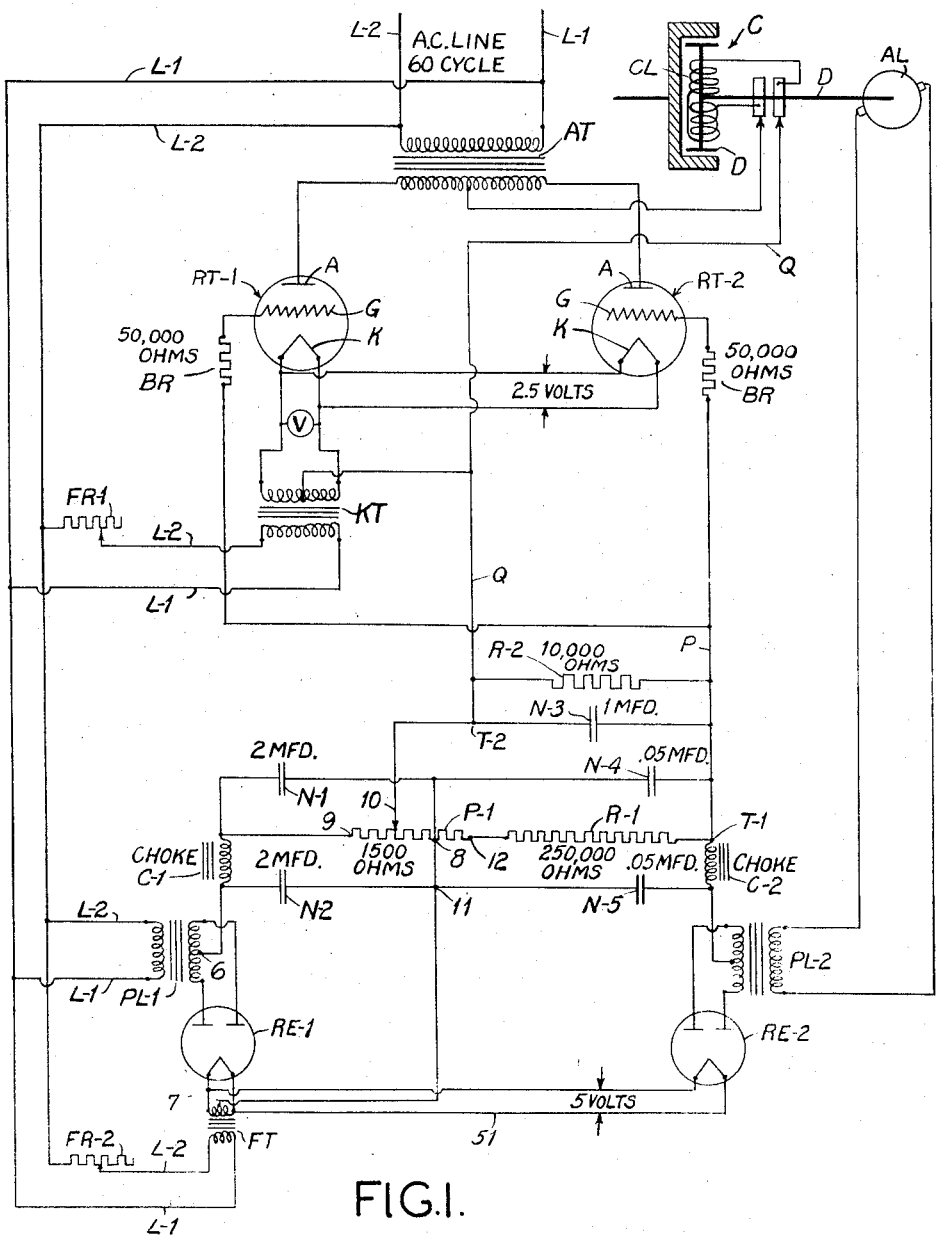

March 24, 1942.  A. WINTHER  2,277,284

ELECTRICAL GOVERNOR

Filed June 28, 1941    2 Sheets-Sheet 1

Anthony Winther,
Inventor.
Haynes and Koenig
Attorneys.

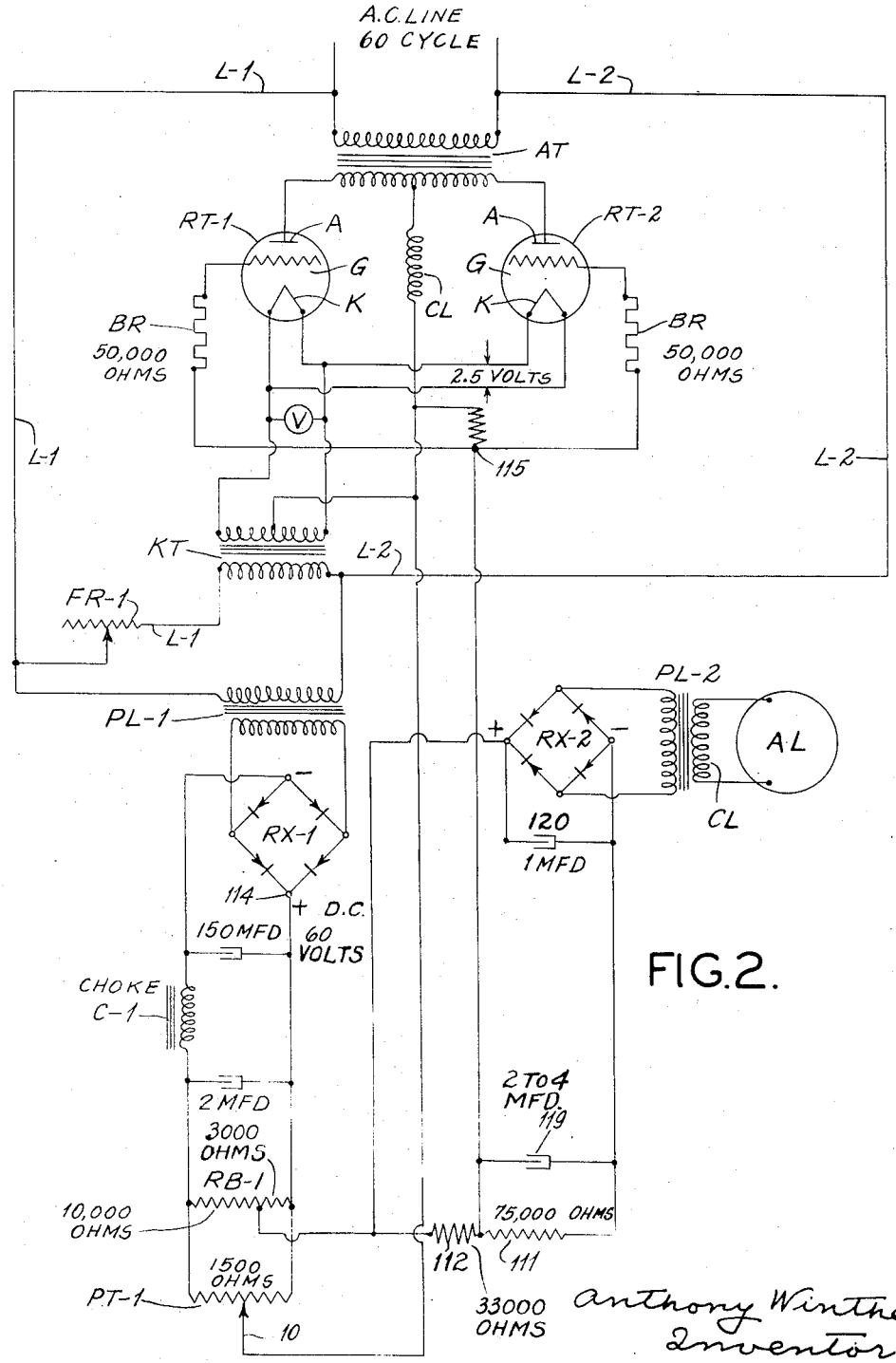

Patented Mar. 24, 1942

2,277,284

UNITED STATES PATENT OFFICE 2,277,284

ELECTRICAL GOVERNOR

Anthony Winther, Kenosha, Wis., assignor to Martin P. Winther, as trustee

Application June 28, 1941, Serial No. 400,220

13 Claims. (Cl. 172—284)

This invention relates to electrical governors, and with regard to certain more specific features to governors for controlling eddy-current clutches.

Among the several objects of the invention may be noted the provision of means for regulating the speed of an output shaft of an eddy-current clutch; the provision of apparatus of the class described which is independent of any mechanical response of any linkages attached to the member which is having its speed controlled; the provision of a device of the class described which will closely regulate speed under widely varying load conditions; and the provision of apparatus of the class described which provides a speed setting means which may be remotely located with respect to the governed member. Other objects will be in part obvious and in part pointed out hereinafter.

The invention accordingly comprises the elements and combinations of elements, features of construction, and arrangements of parts which will be exemplified in the structures hereinafter described, and the scope of the application of which will be indicated in the following claims.

In the accompanying drawings, in which are illustrated two of various possible embodiments of the invention, Fig. 1 shows a schematic diagram of the invention; and, Fig. 2 is a schematic diagram of an alternative embodiment.

Similar reference characters indicate corresponding parts.

Desirable values for the constants associated with various parts of the circuit are indicated on the drawings, but these are not limiting.

Eddy-current clutches operate on the principle of moving a magnetic field through a homogeneous inductor member to generate eddy-currents which produce heat during slippage. The eddy-currents also induce a field which through flux reaction accelerates and drives the driven member. It is often desirable to regulate the speed of the driven member, but this is difficult. Close regulation of an eddy-current clutch requires control of more variables than would enter into the regulation of devices such as motors and generators. For example, the heating of the eddy-current member causes the flux gap to increase or expand, and this expansion in turn causes decrease in torque transmitted. Also, the gaps in eddy-current clutches are limited to much smaller values than those in motors and generators, so that a given gap change has a higher ratio of effect. In addition, the temperature rise in eddy-current machines is substantially higher than that for electric generators and motors; for example, 200° to 300° F. above room temperature as compared to a 90° F. rise in the case of motors and generators.

Eddy-current slip clutches of the type herein referred to are shown, for example, in my United States Reissue Patent 20,225, dated December 29, 1936, and original Patents 2,106,542, 2,197,990, and others.

Another difficulty in regulating these clutches is that the torque curve changes in form with every change in excitation, and the difficulty of speed regulation is therefore increased. Thus governors which might be applicable to ordinary D. C. machinery entirely fail in giving close speed regulation with change in load when applied to an eddy-current clutch.

Referring to Figure 1, at CL is shown the winding which provides the flux in the clutch C. This winding will provide a D. C. load for the present apparatus. The direct current for this load is supplied through a pair of three element, hot-cathode, gas-filled, grid-controlled rectifier tubes RT—1 and RT—2 of the half-wave type. These tubes are of such a characteristic as to require the proper grid potential to cause the tubes to fire; otherwise they do not. In this application the grid potential is made adjustable and D. C. potential is preferable, although not absolutely necessary.

At AT is an anode transformer which supplies power for the D. C. clutch load. This transformer AT is connected on its primary side across line wires L—1 and L—2 of an A. C. supply circuit. Anodes A of the tubes RT—1 and RT—2 are shown connected to the opposite ends of the secondary of the anode transformer AT.

Tube cathodes or heater filaments K are energized by a filament transformer KT. The primary of this transformer is also energized from the supply line wires L—1 and L—2. It is regulated by means of a filament rheostat FR—1.

The grids of the tubes RT—1 and RT—2 are shown at G in series with resistors BR. Resistors BR are grid current-limiting resistors, whereby the grid currents are held to a low value. Suitable values for these resistors are 50,000 ohms each.

The opposite ends of the secondary of the transformer KT are respectively connected across the cathodes K of the rectifier tubes RT—1 and RT—2.

The secondaries of the anode transformer AT and of the cathode transformer KT are connected together at their center taps, as shown, through the clutch coil CL, which provides the D. C. load. Thus the D. C. load through the clutch coil CL may flow, when permitted, between center taps of the transformer AT, the transformer KT and through the rectifier tubes RT—1 and RT—2, as these tubes are fired or released by the grids G to pass current unidirectionally.

At AL is shown a permanent-magnet A. C. generator, operating preferably at relative high frequencies to eliminate pulsations and any tendency to resonate, although this high frequency is not always necessary. This generator AL is connected to the driven part D of the clutch C. Thus the generator AL responds to the speed of the driven member of the clutch. If higher frequency alternations are desired, a larger number of poles may be used on the generator, or its rotary speed may be increased by gearing. In any event, the speed of the generator is proportional to the speed of the driven member of the clutch for which coil CL furnishes the coupling field.

The voltage generated by AL is to be used to balance or cancel out the positive grid voltage required to fire or release the tubes RT—1 and RT—2. As long as the tubes fire, the clutch coil CL is energized for effecting coupling, which is under a definite grid bias. Then the voltage generated by the generator AL is used to balance or cancel this grid voltage to reduce the coupling under excess speeds. In this manner the grid bias can be made negative to stop the tubes in response to certain speed conditions of the generator AL and thus a further increase of speed on the part of the clutch prevented.

On the other hand, if the voltage of the generator AL falls, as upon incipient speed decrease, the positive values of the grid potentials are increased, so that the tubes fire and thus increase the excitation and hence the speed of the driven member of the clutch. The system will therefore be seen to comprise a means of establishing a relatively fixed grid bias voltage according to a desired speed of the clutch driven member, and a means of changing this voltage in response to a change in speed of the output shaft.

Tubes RE—1 and RE—2 are of the full-wave rectifier type. RE—1 is used for the purpose of supplying a direct current for grid potential for grids G. Its anode current is supplied by a transformer PL—1 operating from the A. C. source L—1, L—2. The D. C. circuit of this tube RE—1 passes through point 7 of transformer FT, then through points 11, 8, choke C—1, and back through point 6 which is the center tap of the anode transformer PL—1. Choke C—1 is to eliminate rectifier pulses and condensers N—1 and N—2 assist in filtering the D. C. current. Point 8 is on a potentiometer resistance P—1, the other end of which is at 9. Therefore, there is a potential gradient from the point 8 to the point 9 through the resistor P—1. This potential is transmitted to point T—2 by an adjustable contact 10. This potential is also applied to the two cathodes K in tubes RT—1 and RT—2 through the center tap of transformer KT (see connection Q).

Point 8 on resistance P—1 is connected to a point T—1 through a resistor R—1. This circuit is closed through resistance R—2 back through T—2 and 10, so that a potential difference is applied at T—1. This difference is proportional to the position of the potentiometer contact 10. Condensers N—4 and N—5 assist in interchanging pulsations between the points T—1 and 10.

Point 11, which is on the positive output side of the tube RE—1, is joined to a choke coil C—2 through condenser N—5, and is therefore also electrically connected to point T—1.

A negative potential for regulation of the grids G in the principal tubes RT—1 and RT—2 is supplied by the action of the tube RE—2. This negative potential originates at the center tap of transformer PL—2, the primary of which is fed from the A. C. generator AL.

The D. C. circuit for the tube R—2 is as follows: Starting at point 1 on transformer FT to point 8, we pass through resistance R—1 to point T—1, choke coil C—2, and to the negative center tap of the secondary of the transformer PL—2, then through the tube RE—2 and back to the transformer by means of connection 51.

In the above manner, the point T—1 is held at a higher positive potential with respect to the point 8 than could alone be accomplished from the circuit of tube RE—1.

The resistor R—2 causes potential difference between points T—1 and T—2, regardless of where the contact point 10 happens to be on potentiometer resistance P—1. In this respect the entire grid voltage supply of point T—1 is always held relatively positive to point T—2, and in this manner the grids G are always in condition for firing under normal conditions.

The potential generated by tube RE—2 is directly proportional to the E. M. F. generated by the generator AL and this provides the desired regulating control.

Operation is as follows:

Assuming that the clutch has been energized and is driving its output shaft with the load connected, it may be seen that the generator AL will be rotating. Contact point 10 can be moved along the potentiometer P—1 to establish a certain selection of potential along P—1 and to transmit that potential to the filament cathodes K of tubes RT—1 and RT—2. If the grids G are negative in respect to cathodes K, the tubes will not fire, and will thus diminish the current in the clutch coil CL, thus increasing the slip in the clutch and reducing the speed of its driven member.

On the other hand, if the grids G are positive with respect to cathodes K, the tubes RT—1 and RT—2 will conduct current an energize the clutch coil CL, thus tightening the magnetic coupling and reducing slip. If the clutch is connected to a source of constant speed input power, then under the conditions named, the clutch will run up to a certain speed which will be limited by the action of the generator AL. Thus, assuming a certain potential in cathodes K, due to adjustment at 10, the clutch driven member D will accelerate until the potential generated by the generator AL will cause the tube RE—2 to pass current. As a resulting potential increases, current is drawn through the resistor R—1, through the choke C—2 to the center tap of the secondary on transformer PL—2. Since the point P—1 is normally held relatively positive when the tube RE—2 fires heavily, a charge is drawn off from point T—1 via point 8, through the resistor R—1. However, since the resistor R—1 is of a very high value (250,000 ohms) and has a strong restrictive force, the potential will be dropped at T—1 when a heavy current is drawn through C—2, by virtue of action of tube RE—2. That is to say, the potential at T—1 is reduced and therefore the potential of grids G will become relatively negative and in this way they will cause tubes RT—1 and RT—2 to reduce their rate of conduction and hence decrease the D. C. supply to clutch coil CL, which causes slippage with a consequent reduction in speed of the generator AL. Thus generator AL drops its potential on the transformer PL—2 and tends to permit increase again of the potential at T—1. By this incipient increase and decrease of the potential at point T—1, a regulating effect is created on grids G, so that the current flowing in the clutch coil CL becomes regulated by the incipient increase and decrease in the speed of the generator AL connected to the clutch driven element. Since the potential on the cathodes K set by point 10 is fixed at the will of the operator, it follows that a certain potential generated by the generator AL will tend to balance the effect of such a setting at a predetermined point which is under operator control. Thus the grids G will cause the tubes RT—1 and RT—2 to fire and then to cease firing, fire again, etc.

Close regulation is primarily possible because tubes RT—1 and RT—2 are controlled within very close voltage limits by the grids G. The regulation occurs with a small voltage change in the grids G. It is to be understood that the word "regulation" does not necessarily mean that the current is entirely shut off in the tubes and reestablished by grids G.

The potentiometer P—1 may be remotely located with respect to the clutch coil CL, so that remote control is provided for. It is clear that by suitable switching arrangements, several potentiometers such as P—1 could be located at remote points for control from such points.

If the speed of the clutch driven member, which controls the speed of the generator AL, is reduced to a very low value, the frequency of the alternating current from the generator AL will also drop to very low values in cycles per second, so that a pulsating or oscillating effect might conceivably be generated in the clutch coil CL, and it is for this reason that it is preferable to make the generator AL of high frequency. While a permanent-magnet generator is desirable, it is to be understood that this is not an indispensable feature.

Condensers N—4 and N—5 have a filtering action on the D. C. circuit of the tube RE—2, in conjunction with the choke C—2.

The resistors BR are fed from a common lead P, which is connected with a lead Q, the latter being connected with the clutch winding CL. P and Q are connected by the resistor R—2 and by one microfarad condenser N—3. The resistor R—2 permits an additional blocking resistance between the points T—1 and any points elected to contact at 10. The condenser N—3 is a by-passing condenser used to eliminate undue blocking by the resistor R—2.

Another function of the resistor R—2 is to supply a level of potential difference between the grids G and cathodes K to prevent cumulative charges from affecting the free action of the grids G. Resistors BR are preferably of a high value, purposely selected to further reduce grid current leakage between grids G and cathodes K.

From the above it will be seen that broadly speaking the tube RE—1 predeterminately biases the grids G according to the adjustment at 10, and the tube RE—2 controls the bias in response to speed change of generator AL. The resulting speed correction is (by slip in the clutch) opposite to the incipient deviation from the desired speed of the driven shaft. Inasmuch as the current consumed by the grids G of the tubes RT—1 and RT—2, in relation to the current through cathodes K, is minute, the current flow through resistance R—1 from the high positive point 8 through the grids G and back to the cathodes K is so small that the point T—1 is at the same potential as point 8, unless this potential at T—1 is reduced by the action of tube RE—2. Thus tube RE—2 exerts governing control.

Point 12 has been especially indicated on potentiometer P—1 in the drawings and may be noted to be beyond the normal adjusting side of point 8. For certain speed adjustments it may be desirable to pass the point 8 to the right.

In tests made it has been found that the clutch in which is the coil CL can be loaded from, say, 10% of its full capacity to 100% of its full capacity at a given speed setting of the point 10 without making more than a 2% change in the speed of the output shaft of the clutch which drives the generator AL. Thus the regulation is close for widely varying load conditions.

In Fig. 2 is shown a modification of the invention in which dry rectifiers are used in place of vacuum tubes in connection with the generator AL. These have certain advantages, the primary one being that the number of tubes is reduced by one-half, thus eliminating some tube failure hazards. With the selenium type of dry rectifier, long life is assured. Furthermore, dry rectifiers have none of the sensitive electrical characteristics usually associated with vacuum tubes and steadier conditions may thus be more easily maintained.

Broadly speaking, the circuit of Fig. 2 is like that of Fig. 1 and in order to avoid circumlocution, like reference characters have been applied to parts that operate similarly to those already described. And, in Fig. 2 the only part of the clutch C that has been shown is the winding CL, but it is to be understood that the driven member of the clutch is connected with the generator AL for simultaneous rotation, as in the case of Fig. 1.

In Fig. 2, instead of the two tubes RE—1 and RE—2 (of Fig. 1) there are used dry rectifiers RX—1 and RX2. Rectifier RX—1 is fed from transformer PL—1 and establishes the basic conditions (including negative bias) for preventing firing of the tubes. The generator AL, through the rectifier RX—2, provides modifying voltage which either permits firing or prevents firing of the tubes RX—1 and RX—2 in accordance with speed decrease or increase, respectively.

Speed setting is accomplished by adjustment of the potentiometer PT—1. The resistors RB—1 constitute a fixed parallel leakage means across the rectifier RX—1 and are designed to be tapped properly to deliver the proper voltage to point 115 through the resistor 112. This establishes the basic voltage on the grids G, which is modified by the output from the rectifier RX—2, as controlled at the potentiometer PT—1.

Thus, it will be clear that the basic operation of the circuit of Fig. 2 is like that of Fig. 1, except that the sometimes more desirable rectifiers RX—1 and RX—2 are used.

In addition, the circuit of Fig. 2 has advantageous anti-hunting characteristics due to the use of resistors 111, 112 and a condenser 119. The generator AL functions to prevent the firing of the tubes RT—1 and RT—2 when the driven member of the clutch (to which the generator AL is attached) incipiently increases in speed. When the voltage of the generator AL rises, the voltage delivered by the rectifier RX—2 rises. Therefore, a tendency for the speed to increase is offset by the effect of a rise in the voltage of the circuit connected with the rectifier RX—2, which stops the tubes from firing and reduces the tightness of the electromagnetic connection caused by the field around coil CL.

I have discovered that if the ordinary time elements involved in applying the increased voltage from RX—2 are allowed to operate, without any such contrivance as the condenser 119, there is a certain delay in the application of this voltage. That is, the delay in application of rising voltage from RX—2 to the circuit of RX—1 delays the control that the operation of the generator AL effects upon the grids G. Therefore, we have placed the condenser 119 in parallel with the resistance 111, as shown. This condenser 119 has the effect of promptly passing across itself any rise in voltage due to increase in speed of the generator AL. This occurs according to the usual theory of static transfer of the potential. This static transfer takes place instantaneously, although it occurs only during a momentary surge. However, this surge quickly accomplishes the result of increasing the negative voltages on the grids G, thereby promptly shutting off the tubes in response to an incipient speed rise.

Ordinarily, too quick and continuous a response by grids G will be a disadvantage because clutch speed may then be caused to drop too rapidly and favor hunting. But, in a very small fraction of time after the condenser 119 has had its upward surge of potential, the parallel resistor 111 discharges the surge, thus causing the condenser promptly to cease its corrective function. Therefore it will be seen that the condenser has the function of a quick corrective action, followed immediately by cessation of this action, so that the response to incipient speed increase of the generator AL is quick, but for a short time, so that the tendency to overrun the correction is immediately offset. Thus, hunting is prevented. Similar operation occurs upon incipient speed reduction of the generator AL.

The resistor connected to point 115 may be valued from 5000 to 10,000 ohms. It aids close regulation, the regulation being closer with higher resistance. It is to be understood, however, that if desired, the apparatus can be operated without this resistance with regulation that is acceptable, since the desired leak condition between the cathode circuit of wire 10 and point 115 is fairly well made by resistor 112 and the 3000 ohm portion of resistor RB—1, as well as one leg of the potentiometer PT—1.

The term "dry rectifier" is used herein generically to designate rectifier means which are not of the vacuum type and includes selenium and copper-oxide rectifiers, and the like.

In the above, selenium rectifiers have been mentioned. The efficiency of these is of the order of 70%, while the efficiency of others, such as copper oxide, is lower; but use of the latter (or others) is not intended to be excluded.

The function of the condenser 120 is to have a stabilizing effect on the voltage produced by the generator AL. It has a slight filtering effect and eliminates D. C. peaks. Thus, there is a semi-filtering effect by the use of this condenser.

In view of the above, it will be seen that the several objects of the invention are achieved and other advantageous results attained.

As many changes could be made in the above constructions without departing from the scope of the invention, it is intended that all matter contained in the above description or shown in the accompanying drawings shall be interpreted as illustrative and not in a limiting sense.

I claim:

1. Control apparatus for an eddy-current clutch having a driving member and a driven member and a D. C. field coil, comprising an A. C. supply circuit, at least one rectifier tube energized from the A. C. supply circuit to supply direct current to said coil, a control grid in the tube, a second rectifier supplied from said A. C. circuit, a circuit for said second rectifier adapted to apply grid bias to control the action of said first-named tube in exciting said field coil, an adjustable potentiometer in said second rectifier circuit, a generator connected with said driven member for proportional angular velocity in relation thereto, and a third circuit supplied by the generator and adapted to apply a modifying potential to said control grid in accordance with the angular velocity of the generator, to modify the adjusted bias from said second-named rectifier.

2. Control apparatus for an eddy-current clutch having a driving member and a driven member and a direct current field coil, comprising at least one rectifier tube supplying direct current to said coil, a control grid in the tube, a second rectifier, a circuit for said second rectifier including an adjustment to apply an adjustable bias to said control grid, a generator connected with said driven member for proportional angular velocity in relation thereto, and a third circuit supplied by the generator and adapted to apply a modifying potential to said grid in accordance with the angular velocity of the generator to modify the adjusted bias from said second-named rectifier.

3. Control means for an eddy-current clutch which has a driving and a driven member and a D. C. exciting coil, comprising an A. C. generator coupled to the driven member to generate a voltage in a proportion to the velocity of the driven member, a relatively constant potential A. C. supply circuit, at least one grid rectifier tube energized from said constant potential A. C. circuit and supplying direct current to the clutch coil, a second rectifier supplied with energy from said constant potential A. C. circuit, a circuit supplied from said second rectifier, an adjustable potentiometer in said last-named circuit and supplying adjustable potential to said grid to control the rectification of current to the clutch coil, a third rectifier supplied with variable potential current from said generator, a third circuit supplied from said third rectifier, and means in said third circuit for controlling the potential from the second-named circuit, whereby the grid bias of said rectifier for the clutch coil is modified in response to speed of the driven member of the clutch.

4. Control means for an eddy-current clutch which has a driving and a driven member and a D. C. exciting coil, comprising an A. C. generator coupled to the driven member to generate a variable potential, at least one grid rectifier tube supplying direct current to the clutch coil, a second rectifier, a circuit supplied from said second rectifier, an adjustable potentiometer in said last-named circuit and supplying an adjustable potential to said grid to control the rectification of current to the clutch coil, a third rectifier supplied with variable potential from said generator, a third circuit supplied from said third rectifier, and means in said third circuit for controlling the potential from the second-named circuit, whereby the grid bias of said rectifier for the clutch coil is modified in response to speed of the driven member of the clutch.

5. Control apparatus for an eddy-current clutch having a field coil and driving and driven members, comprising an A. C. generator driven by said driven member, an A. C. supply circuit, a rectifier feed circuit connected to the field winding and fed from said A. C. supply circuit to energize the clutch coil with direct current, control means in said rectifier feed circuit, a first control rectifier circuit fed from said A. C. supply circuit connected to said control means, and a second control rectifier circuit energized from said generator and connected to modify the control effect of said first-named control rectifier circuit.

6. Control apparatus for an eddy-current clutch having a field coil and driving and driven members, comprising an A. C. generator driven by said driven member, an A. C. supply circuit, a rectifier feed circuit connected to the field winding and fed from said A. C. supply circuit to energize the clutch coil with direct current, control means in said rectifier feed circuit, a first control rectifier circuit fed from said A. C. supply circuit connected to said control means, and a second control rectifier circuit energized from said generator and connected to modify the control effect of said first-named rectifier circuit, said control rectifier circuits being connected for voltage opposition.

7. Control apparatus for an eddy-current clutch having a field coil and driving and driven members, comprising an A. C. generator driven by said driven member, an A. C. supply circuit, a rectifier feed circuit connected to the field winding and fed from said A. C. supply circuit to energize the clutch coil with direct current, control means in said rectifier feed circuit, a first control rectifier circuit fed from said A. C. supply circuit connected to said control means, and a second control rectifier circuit energized from said generator and connected to modify the control effect of said first-named control rectifier circuit, said control rectifier circuits being connected for voltage opposition, a resistance in said second control rectifier circuit, and a condenser shunting the resistance, said condenser temporarily but quickly applying correcting opposition voltage and said resistance thereafter preventing excessive continuation of application of said correcting voltage.

8. Control apparatus for an eddy-current clutch having a field coil and driving and driven members, comprising an A. C. generator driven by said driven member, an A. C. supply circuit, grid-controlled rectifier tubes connected to said A. C. supply circuit to energize the clutch coil with direct current, a dry rectifier circuit fed from said A. C. supply circuit connected with the grids of said tubes for controlling their firing, a second dry rectifier circuit energized from said generator and connected to modify the control effect of said first-named dry rectifier circuit, the voltages of said dry rectifier circuits being opposed, a resistance in the last-named rectifier circuit, and a condenser shunted across said resistance adapted quickly to apply correcting voltage to the first dry rectifier circuit, said resistance thereafter promptly reducing the potential across the condenser to prevent over-correction.

9. Control apparatus for an eddy-current clutch having a field coil and driving and driven members, comprising an A. C. generator driven by said driven member, an A. C. supply circuit, grid-controlled rectifier tubes connected to said A. C. supply circuit to energize the clutch coil with direct current, a dry rectifier circuit fed from said A. C. supply circuit connected with the grids of said tubes for controlling their firing, a potentiometer control in said dry rectifier circuit, a second dry rectifier circuit energized from said generator and connected in voltage opposition with said first-named dry rectifier circuit, a resistance in the last-named rectifier circuit, and a condenser shunted across said resistance adapted quickly to apply correcting voltage to the first dry rectifier circuit, said resistance thereafter promptly reducing the potential across the condenser to prevent over-correction.

10. Control apparatus for an eddy-current clutch having a field coil and driving and driven members, comprising an A. C. generator driven by said driven member, vacuum tube means for energizing the clutch coil including a control grid, a control circuit including an adjustable potentiometer for controlling the potential upon said control grid, and a second control circuit energized from said generator in proportion to generator velocity connected in voltage opposition to said first-named control circuit.

11. Control apparatus for an eddy-current clutch having a field coil and driving and driven members, comprising an A. C. generator driven by said driven member, vacuum tube means for energizing the clutch coil including a control grid, a control circuit including an adjustable potentiometer for controlling the potential upon said control grid, a second control circuit energized from said generator in proportion to generator velocity connected in voltage opposition to said first-named control circuit, and means in one of said control circuits comprising a condenser for reducing hunting.

12. Control apparatus for an eddy-current clutch having a field coil and driving and driven members, comprising an A. C. generator driven by said driven member, vacuum tube means for energizing the clutch coil including a control grid, a control circuit including an adjustable potentiometer for controlling the potential upon said control grid, a second control circuit energized from said generator in proportion to generator velocity connected in voltage opposition to said first-named control circuit, and means in the control circuit energized by the generator for reducing hunting and comprising a resistance in series with the last-named circuit and a condenser shunting said resistance and connected with said grid.

13. Control apparatus for an eddy-current clutch having a driving member and a driven member and a D. C. field coil, a D. C. circuit including said field coil, at least one rectifier tube in said D. C. circuit and supplying said D. C. circuit with direct current to energize said field coil, a control grid in the tube, a second circuit including means for applying a predetermined constant biasing potential to said control grid causing current normally to flow in said field coil circuit, a generator connected with said driven member for proportional angular velocity in relation thereto, and a third circuit supplied from the generator and including means connected with the grid to apply potential in opposition to said biasing potential to modify the bias on the control grid in accordance with angular velocity of the generator, thus tending to reduce current flow in said field coil circuit as the speed of said driven member incipiently increases.

ANTHONY WINTHER.